Patented Jan. 11, 1944

2,339,200

UNITED STATES PATENT OFFICE 2,339,200

PROCESS FOR PREVENTING TARNISHING OF METALS

Frank J. Sowa, Cranford, N. J.

No Drawing. Application August 8, 1941,
Serial No. 406,013

7 Claims. (Cl. 106—287)

The invention relates in general to preventing the tarnishing of metal surfaces and in particular to a composition for preventing the tarnishing of silver and the like.

Many metals such as silver, copper, chromium, nickel, aluminum, lead and alloys such as pewter, brass and the like, frequently become discolored due to chemical action of various sulphur and nitrogen compounds in the atmosphere. This discoloration hereinafter called "tarnishing" is objectionable because it reduces the luster, etches the surface and detracts from the appearance of the article. Many compositions have been proposed heretofore for preventing the tarnishing of metals such as silver and these compositions have almost invariably comprised a solution of a water insoluble wax in a volatile organic solvent. The use of such compositions is objectionable because of the odor, possible fire hazard and toxicity of the organic solvent, the greasy nature of the wax, and the fact that the wax could not be removed by merely washing the metal surface with water. Such protective film of water-insoluble wax could be removed only by scrubbing with hot soap solution of sufficient concentration to emulsify the wax.

It is the general object of the present invention to overcome the disadvantages of prior compositions for preventing the tarnishing of metals.

It is another object of this invention to provide a composition for preventing the tarnishing of metals, in particular of silver, which shall be odorless, colorless, free from fire hazard and nontoxic.

It is another object to provide a composition for preventing the tarnishing of metals, which shall be easy to apply and which may be readily removed by merely washing the metal surface with water.

Other objects of the invention will in part be obvious and will in part appear hereafter.

According to the present invention there is provided a novel composition for preventing the tarnishing of metals comprising an aqueous dispersion of a film-forming hydrophilic colloid.

The film-forming hydrophilic colloids as a class may be used in the composition and the following are given merely by way of illustration: gelatine, casein, Irish moss, water-soluble cellulose ethers, water-soluble or water-dispersible gums such as gum tragacanth, arabic, angico and mesquite gum; water-soluble synthetic resins such, for example, as urea-aldehyde resins, glyptal resins, polyvinyl alcohol resins and the like, which resins are in the first or water-soluble stage of condensation, and the water-soluble film-forming mono- and di-esters of polyhydric alcohols which are solids or viscous liquids, and those wax-like derivatives of polyhydric alcohols which are sold under the trade name "Carbowax" by Carbide & Carbon Chemicals Corporation. These derivatives are of two classes, namely, "Carbowax" 1500, which is a soft water-soluble wax-like compound having a density of 1.15, a melting range of 34 to 37° C. a viscosity of 190 sec. and a flash point of 430° F. There may also be used "Carbowax" 4000, which is a hard water-soluble wax-like compound having a density of 1.2, a melting range of from 50 to 55° C., a viscosity of 689 sec. and a flash point of 535° F. I prefer to use "Carbowax" 4000 since it is harder, has a higher melting range and does not absorb as much moisture from the atmosphere as "Carbowax" 1500.

Among the esters of polyhydric alcohols I may employ, as the film-forming agent, any of the water-soluble mono- or di-esters of glycerine, the glycols, mannitol and sorbitol and the like, with any of the fatty acids, in particular, the higher fatty acids. All of these compounds are clearly distinguishable from the natural occurring fats, which are tri-esters of glycerine and are not water-soluble. The following esters, suitable for use in this invention, are given by way of illustration but not by way of limiting the invention:

Glyceryl (mono) oleate
Glyceryl (mono) palmitate
Glyceryl (mono) stearate
Glyceryl (mono) myristate
Glyceryl (mono) laurate
Ethylene glycol (mono) oleate
Diethylene glycol (mono) stearate
Diethylene glycol stearate
Diethylene glycol (mono) oleate
Diethylene glycol (mono) myristate
Mannitol glyceryl (mono) stearate
Mannitol glyceryl (mono) laurate
Mannitol glyceryl (mono) oleate
Propylene glycol (mono) stearate
Sorbitol (di) stearate
Sorbitol glyceryl (mono) stearate All of the above-mentioned compounds are semi-solid or solid wax-like compounds which are either soluble in water or capable of being readily dispersed in water in the presence of a wetting agent. To stabilize the dispersion of those compounds which are not self-dispersing in water and to promote spreading of the composition I may employ any suitable water-soluble wetting agent, such for example, as sulphonated fatty acids or sulphated fatty alcohols such as the compounds sold under the trade name of "Tergitol" and the compound sold under the trade name of "Ingepon," "Aerosol" (American Cyanamid Company), sodium citrate and the like.

There may be added to the composition a suitable perfume if desired to impart a pleasant odor to the composition although this is not necessary since the film-forming agents employed in the present composition have no odor, or a very slight odor.

The proportion of the several ingredients in the composition may be varied depending upon the thickness of the film desired and consideration of cost, etc. For example, the water-soluble film-forming agent may be employed in an amount sufficient to form a continuous film, for example, from 1 to 20%, the wetting agent from .01 to 2% and water the remainder. A specific example of the preferred composition comprises 3% "Carbowax" 4000, .5% "Tergitol" and 96.5% water.

The composition may be applied by spreading it on the metal surface by means of a soft cloth, a brush or by dipping the metal in the composition and allowing the composition to drain therefrom, or by spraying the metal with the composition. Upon the evaporation of the water which may take place at room temperature or may be accelerated by heating, the water-soluble wax-like film-forming agent is deposited on the metal surface in the form of a continuous film. This film is colorless and does not detract from the appearance of the metal, but preserves the luster, color, and protects the surface against attack by sulphur compounds in the atmosphere. When applied to metals the composition may be removed readily by merely washing the metals with water. As the fluid vehicle is aqueous there is no fire hazard involved in the use of the present composition.

I claim:

1. A process for preventing the tarnishing of metals comprising applying over the surface of the metal an aqueous solution of a film-forming hydrophilic colloid and evaporating the solvent to deposit on the surface a thin continuous film of said colloid.

2. A process for preventing the tarnishing of metals, comprising applying over the surface of the metal an aqueous solution of a film-forming hydrophilic colloid and a water-soluble wetting agent, and evaporating the solvent to deposit on the surface a thin continuous film of said colloid.

3. A process for preventing the tarnishing of metals, comprising applying over the surface of the metal an aqueous solution of a water-soluble resin and evaporating the solvent to deposit on the surface a thin continuous film of said resin.

4. A process for preventing the tarnishing of metals, comprising applying over the surface of the metal an aqueous solution of a water-soluble wax-like derivative of a polyhydric alcohol selected from the class consisting of mono- and di-esters of polyhydric aliphatic compounds, and evaporating the solvent to deposit on the surface a thin continuous film of said wax-like derivative.

5. A process for preventing the tarnishing of metals, comprising applying over the surface of the metal an aqueous hydrophilic colloidal solution containing up to 20% of a substantially solid wax-like derivative selected from the group consisting of the mono-esters of polyhydric alcohols reacted with higher fatty acids, and evaporating the liquid portion of the solution to deposit on the metal surface a thin continuous film of said derivative.

6. A process for preventing the tarnishing of metals, comprising applying over the surface of the metal an aqueous hydrophilic colloidal solution of a substantially solid wax-like derivative selected from the group consisting of the mono-esters of polyhydric alcohols reacted with higher fatty acids, and a water-soluble wetting agent, and evaporating the liquid portion of the solution to deposit on the metal surface a thin continuous film of said derivative.

7. A process for preventing the tarnishing of metals, comprising applying over the surface of the metal an aqueous hydrophilic colloidal solution containing up to 20% of a substantially solid wax-like derivative selected from the group consisting of the mono-esters of glycerine and mannitol reacted with lauric acid, and evaporating the liquid portion of the solution to deposit on the metal surface a thin continuous film of said derivative.

FRANK J. SOWA.